(12) United States Patent
Chaudhuri et al.

(10) Patent No.: US 8,787,433 B2
(45) Date of Patent: Jul. 22, 2014

(54) WALL CLOCK TIMER AND SYSTEM FOR GENERIC MODEM

(75) Inventors: Arunava Chaudhuri, San Diego, CA (US); Iwen Yao, San Diego, CA (US); Jeremy H. Lin, San Diego, CA (US); Remi Gurski, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 877 days.

(21) Appl. No.: 12/261,937

(22) Filed: Oct. 30, 2008

(65) Prior Publication Data

US 2009/0245334 A1    Oct. 1, 2009

Related U.S. Application Data

(60) Provisional application No. 61/040,626, filed on Mar. 28, 2008.

(51) Int. Cl.
*H04B 1/38* (2006.01)
*H04L 12/28* (2006.01)

(52) U.S. Cl.
USPC ...... 375/222; 375/220; 375/219; 370/395.52; 370/395.5; 370/395.53

(58) Field of Classification Search
USPC ......... 370/254, 255, 310, 328, 352, 357, 360, 370/395.5, 395.52–395.53; 375/219, 220, 375/221, 222, 257, 260, 295, 316, 340, 328, 375/351, 339, 338, 356, 358
See application file for complete search history.

(56) References Cited

U.S. PATENT DOCUMENTS

| 5,790,817 | A | 8/1998 | Asghar et al. |
| 5,968,167 | A | 10/1999 | Whittaker et al. |
| 6,125,404 | A | 9/2000 | Vaglica et al. |
| 6,128,307 | A | 10/2000 | Brown |

(Continued)

FOREIGN PATENT DOCUMENTS

| JP | 2006135707 A | 5/2006 |
| JP | 2006221638 A | 8/2006 |

(Continued)

OTHER PUBLICATIONS

Definition of 'circuit', 2000, Houghton Mifflin Company.

(Continued)

*Primary Examiner* — Sam K Ahn
*Assistant Examiner* — Linda Wong
(74) *Attorney, Agent, or Firm* — Abdollah Katbab

(57) ABSTRACT

A modem (for example, a modem within a cellular telephone) includes a plurality of Wireless Communication System Modem Sub-Circuits (WCSMSCs). Each WCSMSC receives a control signal generated by a corresponding one of a plurality of programmable timers. Each timer receives the same sequence of count values from a wall clock counter. A processor that controls overall modem operation can program a timer to generate a control pulse at a particular count time of the wall clock counter. The processor can also program a timer to generate a periodic control signal. The control signals output from the timers orchestrate when the various WCSM-SCs start operating in the processing of a frame. By virtue of the programmability of the timers, the wall clock timer system is programmable to generate customized control signals such that frames of new and different protocols having arbitrary frame structures can be processed by the same modem/timer system.

30 Claims, 6 Drawing Sheets

(56) References Cited

U.S. PATENT DOCUMENTS

| | | |
|---|---|---|
| 6,259,371 B1 * | 7/2001 | Chang .................... 340/659 |
| 6,292,887 B1 | 9/2001 | Janniello |
| 6,560,715 B1 | 5/2003 | Bourdillat et al. |
| 6,577,678 B2 | 6/2003 | Scheuermann |
| 7,096,288 B2 | 8/2006 | Liao et al. |
| 7,240,231 B2 | 7/2007 | Conway |
| 7,937,591 B1 | 5/2011 | Master et al. |
| 2003/0110420 A1 * | 6/2003 | Smith et al. .................. 714/43 |
| 2004/0008715 A1 | 1/2004 | Barrack et al. |
| 2004/0187122 A1 | 9/2004 | Gosalia et al. |
| 2004/0203965 A1 * | 10/2004 | Robinson .................. 455/502 |
| 2004/0208181 A1 | 10/2004 | Clayton et al. |
| 2005/0223382 A1 | 10/2005 | Lippett |
| 2006/0120495 A1 * | 6/2006 | Barber et al. .............. 375/354 |
| 2006/0179436 A1 | 8/2006 | Yasue |
| 2006/0181393 A1 * | 8/2006 | Raphaeli .................. 340/10.1 |
| 2007/0174841 A1 | 7/2007 | Chamberlain et al. |
| 2007/0190947 A1 | 8/2007 | Sakai et al. |
| 2007/0220517 A1 | 9/2007 | Lippett |
| 2008/0003969 A1 * | 1/2008 | Segev et al. ............. 455/277.1 |
| 2008/0036969 A1 | 2/2008 | Otsuka et al. |
| 2008/0215650 A1 * | 9/2008 | Tsatsanis et al. ............ 708/203 |
| 2009/0245192 A1 | 10/2009 | Chaudhuri et al. |
| 2009/0248920 A1 | 10/2009 | Chaudhuri et al. |

FOREIGN PATENT DOCUMENTS

| | | |
|---|---|---|
| JP | 2006270910 A | 10/2006 |
| JP | 2007221385 A | 8/2007 |
| TW | 200525999 | 8/2005 |
| TW | M273772 U | 8/2005 |

OTHER PUBLICATIONS

Definition of 'queue', 2003, Wiley Publishing, Inc.

International Search Report and Written Opinion—PCT/US09/036248—International Search Authority—European Patent Office—Jun. 17, 2009 (081134WO).

Je-Hoon Lee et al: "Implementation of IEEE 802.11a WLAN Baseband Processor" Consumer Electronics, 2007. ICCE 2007. Digest of Technical Papers. International Conference on, IEEE, PI, Jan. 1, 2007, pp. 1-2, XP031071649 ISBN: 978-1-4244-0762-0 the whole document.

Krashinsky R et al: "The vector-thread architecture" Computer Architecture, 2004. Proceedings. 31st Annual International Symposium on Munchen, Germany June 19-23, 2004, Piscataway, NJ, USA,IEEE, Jun. 19, 2004, pp. 52-63, XP010769402 ISBN: 978-0-7695-2143-5 figures 1,3,4,6 p. 1-p. 4 abstract.

* cited by examiner

AIS#1 TIMING

AIS#2 TIMING

WALL CLOCK TIMER AND SYSTEM FOR GENERIC MODEM

CROSS-REFERENCE TO RELATED APPLICATION

This application claims the benefit under 35 U.S.C. §119 of Provisional Application Ser. No. 61/040,626, filed Mar. 28, 2008, said provisional application is incorporated herein by reference.

BACKGROUND INFORMATION

1. Technical Field

The disclosed embodiments relate to the controlling of discrete operations in the processing of communications in different frame formats.

2. Background Information

There are multiple different air interface standards used by cellular telephone systems today. Some companies make integrated circuits that are then used by cellular telephone manufacturers to make cellular telephone data cards. In some situations, it may be desirable for these companies to make one integrated circuit design that is usable by a first cellular telephone manufacturer to make cellular telephones that communicate using a first air interface standard, and that is also usable by a second cellular telephone manufacturer to make cellular telephones that communicate using a second air interface standard. One example of such an integrated circuit is the so-called "digital baseband integrated circuit" of a cellular telephone. In a receive signal path, an incoming signal from an antenna passes through downconverter circuitry in an RF transceiver integrated circuit, and then passes through a receive path portion of the digital baseband integrated circuit. In the digital baseband integrated circuit, the signal path passes through an analog-to-digital converter (ADC), and then through various modem (modulate/demodulate) sub-circuits that demodulate and decode the incoming information and perform various other functions so as to recover digital data bits of information that were communicated. A transmit signal path also passes through the digital baseband integrated circuit. Digital data bits of information to be communicated typically are encoded and modulated by sub-circuits of the modem.

The resulting information is converted to analog form by a digital-to-analog converter (DAC) within the digital baseband integrated circuit. The resulting analog information is then passed to the RF transceiver integrated circuit. The information is upconverted in the RF transceiver integrated circuit, and the resulting upconverted signal is amplified and is driven out onto the antenna for transmission. New circuits and techniques are sought for making a single digital baseband integrated circuit design that is usable to communicate information using multiple such air interface standards.

SUMMARY

A modulator/demodulator (modem) circuit such as a modem within a cellular telephone includes a plurality of Wireless Communication System Modem Sub-Circuits (WCSMSCs). In one example, the plurality of WCSMSCs includes modem sub-circuits in the receive path of the modem such as a Fast Fourier Transform (FFT) sub-circuit, a demodulate sub-circuit, a demap sub-circuit, and a decode sub-circuit. The plurality of WCSMSCs in this example also includes modem sub-circuits in the transmit path of the modem such as an encode sub-circuit, a map sub-circuit, a modulate sub-circuit, an inverse FFT sub-circuit, and a window and add sub-circuit.

In addition to the plurality of WCSMSCs, the modem circuit includes a novel timer block and a processor that executes a set of processor-executable instructions.

The novel timer block includes a wall clock counter and a plurality of programmable signal generators. The wall clock counter is a time base generator that supplies a sequence of incrementing multi-bit count values to each of the programmable signal generators. Once initiated, the wall clock timer is free-running and increments its multi-bit output count values on a constant and regular basis. The rate of incrementing of the wall clock timer is not changed, nor is the count value manipulated.

Each programmable signal generator (also referred to as a programmable timer) of the novel timer block receives the same sequence of multi-bit count values from the wall clock timer and generates therefrom a control signal. In one example, the control signal is a trigger signal that is supplied to a WCSMSC. A pulse of the trigger signal causes the WCSMSC to start performing an operation. For example, if the WCSMSC is a FFT sub-circuit, then the WCSMSC responds to the pulse of the trigger signal by starting to perform a FFT operation on a set of values. In a second example, the control signal is an interrupt signal supplied to the processor. The programmable signal generators are "programmable" in that they can be programmed and reprogrammed during integrated circuit operation such as, for example, by software or firmware executed by the processor.

The processor that controls overall modem operation can load configuration information into each of the programmable signal generators so that the programmable signal generator either generates a single control pulse at a particular count time of the wall clock counter, or generates a control pulse at a particular count time and then generates subsequent controls pulses with a desired periodicity. By loading appropriate configuration information into the various programmable signal generators, the processor can program, start and reset the programmable signal generators individually, and can do so in response to interrupt signals output from programmable signal generators that the processor itself previously set up. The processor can also program, start and/or reset one or more of the programmable signal generators in response to determinations made by a time tracking routine executed by the processor. The processor programs the programmable signal generators such that the control signals output from the signal generators orchestrate when the various WCSMSCs start performing their various operations during the processing of a frame. By virtue of the programmability of the signal generators, the wall clock timer system is programmable to generate customized control signals, aperiodic or periodic, such that frames of new and different protocols having arbitrary frame structures can be processed by the same modem/timer system.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
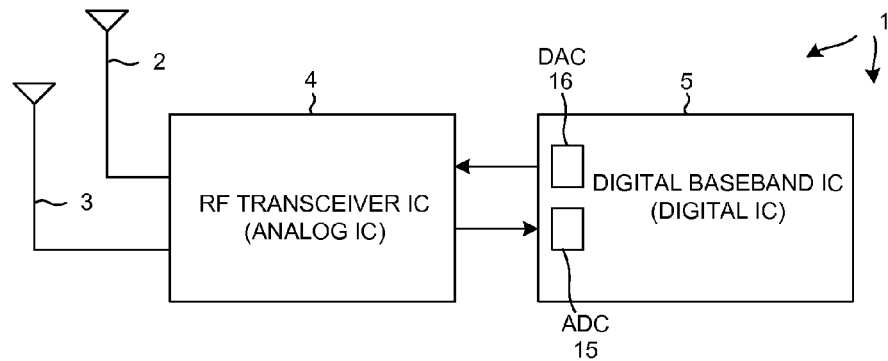
FIG. 1 is a simplified high level block diagram of one particular type of mobile communication device 1 in accordance with one novel aspect.

FIG. 1 is a very simplified high level block diagram of one particular type of mobile communication device 1 in accordance with one novel aspect. In this particular example, mobile communication device 1 is a cellular telephone that can communicate using either a first air interface standard (AIS#1) or a second air interface standard (AIS#2). An example of the first air interface standard is a version of OFDMA (Orthogonal Frequency Division Multiple Access) modulation and SC-FDMA (Single Carrier—Frequency Division Multiple Access) modulation employed by the 3GPP LTE (Long-Term Evolution) specification. An example of the second air interface standard is a version of OFDMA modulation (called Scalable OFDMA or SOFDMA) employed by the WiMAX (Worldwise Interoperability for Microwave Access) specification.

Mobile communication device 1 includes (among several other parts not illustrated) a first antenna 2, a second antenna 3, and two integrated circuits 4 and 5. Integrated circuit 4 is an RF transceiver integrated circuit. RF transceiver integrated circuit 4 is called a "transceiver" because it includes a transmitter as well as a receiver. RF transceiver integrated circuit 4 is principally an analog integrated circuit involving analog circuitry. Integrated circuit 5, on the other hand, is principally a digital integrated circuit that includes digital circuitry. Integrated circuit 5 is called a "digital baseband integrated circuit" or a "baseband processor integrated circuit".

Figure 2:
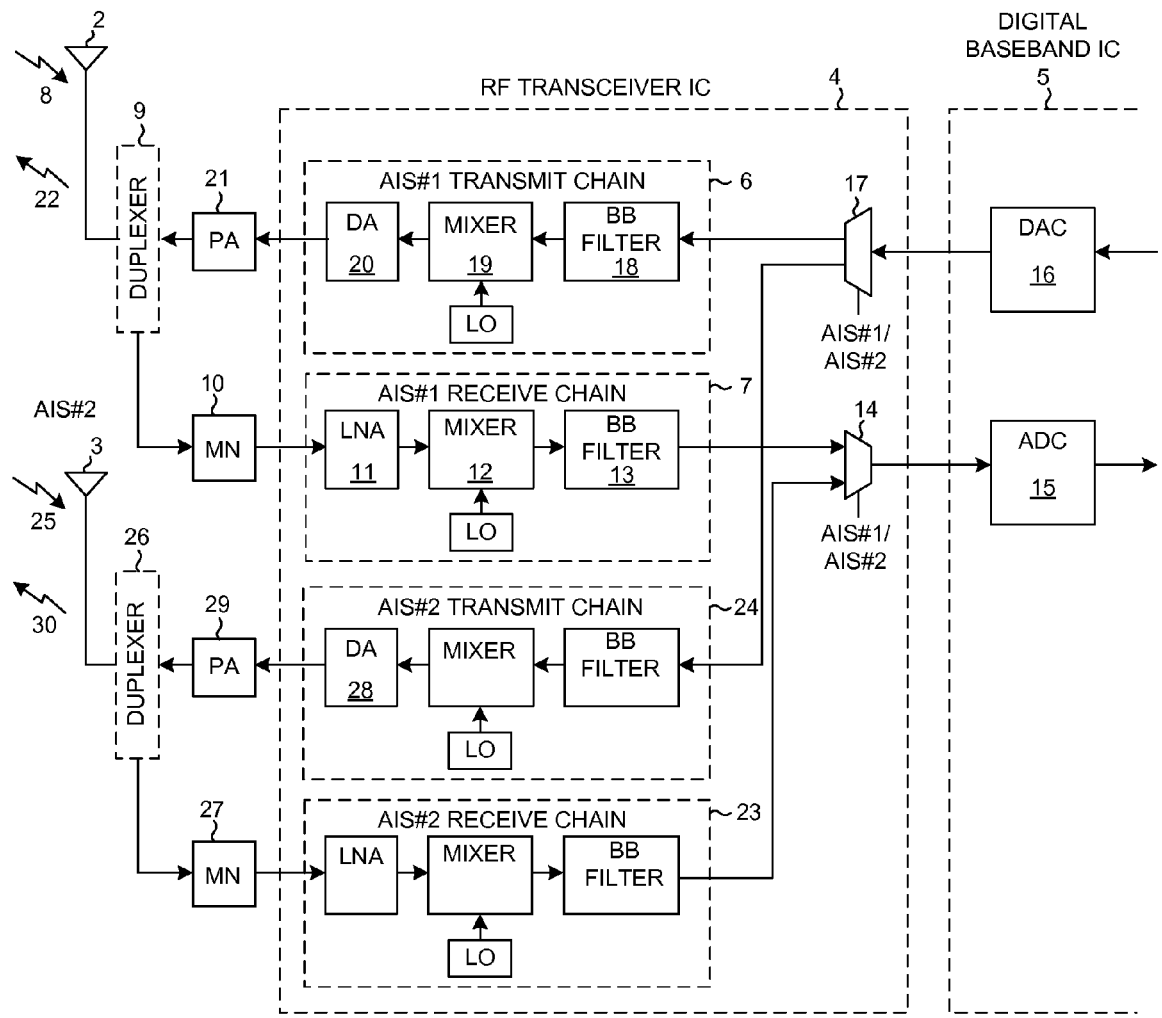
FIG. 2 is a more detailed block diagram of the RF transceiver integrated circuit 4 of FIG. 1.

FIG. 2 is a more detailed block diagram of the RF transceiver integrated circuit 4. If cellular telephone 1 is communicating using the first air interface standard AIS#1, then antenna 2 is used along with transmit chain 6 and receive chain 7. When the cellular telephone is receiving, a high frequency RF signal 8 is received on antenna 2.

Information from signal 8 passes through duplexer 9, matching network 10, and through the receive chain 7. The signal is amplified by low noise amplifier (LNA) 11 and is down-converted in frequency by mixer 12. The resulting down-converted signal is filtered by baseband filter 13 and is passed to the digital baseband integrated circuit 5 by multiplexer 14. An analog-to-digital converter 15 in digital baseband integrated circuit 5 converts the signal into digital form and the resulting digital information is processed by modem (modulator/demodulator) digital circuitry within digital baseband integrated circuit 5.

If the cellular telephone is transmitting, then information to be transmitted passes through a transmit path in the modem within digital baseband integrated circuit 5, and is converted into analog form by a digital-to-analog converter 16. Demultiplexer 17 supplies the resulting analog signal to "transmit chain" 6. Baseband filter 18 filters out noise introduced by the digital-to-analog conversion process. Mixer block 19 then up-converts the signal into a high frequency signal. Driver amplifier 20 and an external power amplifier 21 amplify the high frequency signal to drive antenna 2 so that a high frequency RF signal 22 is transmitted from antenna 2.

The description above describes a situation in which the first air interface standard AIS#1 is employed. If, on the other hand, cellular telephone 1 is communicating using the second air interface standard AIS#2, then antenna 3 is used along with receive chain 23 and transmit chain 24. When cellular telephone 1 is receiving, a high frequency RF signal 25 is received on antenna 3, passes through duplexer 26, matching network 27, receive chain 23, and multiplexer 14, to ADC 15 in the digital baseband integrated circuit 5. The digitized information is then processed by modem circuitry in the digital baseband integrated circuit 5. When cellular telephone 1 is transmitting, then digital information to be transmitted passes through the modem in digital baseband integrated circuit 5, and is converted into analog form by digital-to-analog converter 16 and is supplied to "transmit chain" 24 by demultiplexer 17. After being upconverted, the driver amplifier 28 and the power amplifier 29 drive the high frequency signal through duplexer 26 and onto antenna 3 for transmission as RF signal 30.

Figure 3:
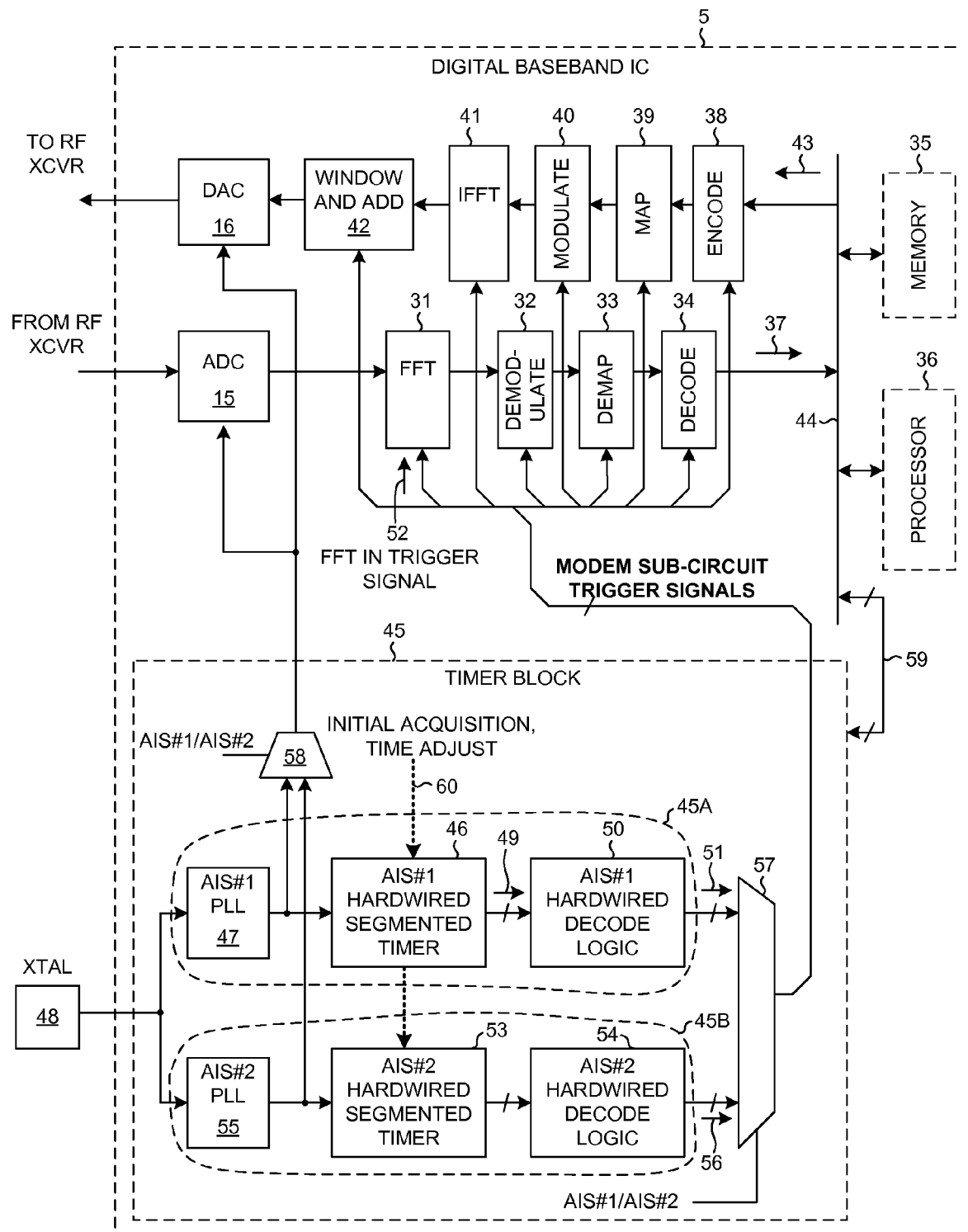
FIG. 3 is a simplified block diagram of a first embodiment of the digital baseband integrated circuit 5 of the mobile communication device 1 of FIGS. 1 and 2.

FIG. 3 illustrates a first embodiment of the digital baseband integrated circuit 5 of FIGS. 1 and 2. The incoming receive path of the modem includes ADC 15, a Fast Fourier Transform (FFT) sub-circuit 31, a demodulate sub-circuit 32, a demap sub-circuit 33, and a decode sub-circuit 34. Receive path information passes from ADC 15, through FFT sub-circuit 31, through demodulate sub-circuit 32, through demap sub-circuit 33, through decode sub-circuit 34, and then into memory 35 for subsequent use and processing by processor 36. Arrow 37 represents the flow of the resulting decoded digital data bits that are the object of the communication through the receive path of the modem. In the illustrated example, each of the sub-circuits 15, 31, 32, 33, and 34 includes a circular First-In-First-Out (FIFO) output buffer (not illustrated). The circular FIFO output buffer can store many multi-bit values. As the sub-circuit generates a new output value, the output value is pushed onto the FIFO output buffer at the next available location in the FIFO output buffer. Processor 36 controls the movement of values out of the FIFO output buffer of one sub-circuit into the next sub-circuit in the signal path by popping the FIFO output buffer of the preceding sub-circuit. The popping of values out of each FIFO buffer is controlled by buffer pop addresses supplied by processor 36 through other signal conductors that are not illustrated in FIG. 3. The transfer of values from one sub-circuit to the next occurs synchronously with respect to another clock signal that is not illustrated in FIG. 3.

The outgoing transmit path of the modem includes an encode sub-circuit 38, a map sub-circuit 39, a modulate sub-circuit 40, an inverse FFT (IFFT) sub-circuit 41, a window and add sub-circuit 42, and DAC 16. As in the case of the sub-circuits in the receive path, each sub-circuit in the transmit path includes a circular FIFO output buffer. The transfer of values from one sub-circuit to the next through these circular FIFO buffers is controlled by processor 36 in the same way that processor 36 controls the transfer of values from sub-circuit to sub-circuit in the receive path. Arrow 43 represents the supply of digital data bits from memory 35 and into encode sub-circuit 38 for transmission. In the illustrated example, processor 36 can access memory 35, decode sub-circuit 34, and encode sub-circuit 38 via a parallel local bus 44. Memory 35 is a processor-readable medium that in this particular example includes an amount of Static Random Access Memory (SRAM) for the storage of data bit values and variables as well as an amount of Non-Volatile Memory (NVM) or Read Only Memory (ROM) for the storage of a program of processor-executable instructions that are executable by processor 36.

Depending on whether the communication being processed is a first air interface standard communication or second air interface standard communication, the various sub-circuits of the receive and transmit paths are made to start and stop processing values at different times with respect to the overall frames of information being processed. For example, depending on the air interface standard being used, there may be a different number of sample values per OFDM symbol, and/or a different number of OFDM symbols per frame. It also may be necessary or desirable to start and/or stop the various sub-circuits of the receive and transmit paths with different time offsets with respect to symbol start times, symbol end times, frame start times, or frame end times. Accordingly, a timer block 45 is provided. This timer block 45 includes a first timer circuit 45A that provides timing signals appropriate for controlling the sub-circuits when the communication being processed is of the first air interface standard. The timer bock 45 also includes a second timer circuit 45B that provides timing signals appropriate for controlling sub-circuits when the communication being processed is of the second air interface standard.

The first timer circuit 45A includes a first phase-locked loop (PLL) 47, a first segmented timer 46, and a first amount of decode logic 50. First PLL 47 receives a reference clock signal from a crystal or crystal oscillator 48 and outputs a clock signal of a selected frequency to first timer 46. The clock signal clocks the first segmented timer 46 such that the outputs 49 of the various segments of the segmented timer 46 change synchronously with respect to the durations of the various portions of frames of a first air interface standard. For example, a first digital multi-bit value output from a first segment of timer 46 increments on frame boundaries, whereas a second digital multi-bit value output from a second segment of timer 46 increments on symbol boundaries. Decode logic 50 receives the outputs 49 and decodes them to generate a set of modem sub-circuit trigger signals 51. The modem sub-circuit trigger signals 51 transition high and low at predetermined times with respect to the duration of the frame. For example, one of the signals 51 is a trigger signal 52 that is supplied to the FFT sub-circuit 31 of the receive path. This FFT IN trigger signal 52 is made to transition high at a certain time offset with respect to the output from ADC sub-circuit 15 of the first value for a corresponding symbol to be FFT-processed. The transitioning high of the FFT IN trigger signal 52 starts the FFT sub-circuit 31 processing values. The time offset with respect to the output of the first values from ADC 15 for each of the successive symbols of an incoming frame is the same. The magnitude of the time offset and the number of times the FFT IN trigger signal is made to transition high per frame is hardwired and predetermined by timer 46 and by the decode hardware within decode logic block 50. Other portions of decode logic 50 decode the outputs of timer 46 to generate the other trigger signals needed to control the other sub-circuits of the modem. Orchestration of the various trigger signals with respect to each other and with respect to the beginning and ending of the physical layer frame is predetermined and hardwired due to the structure of timer 46 and the structure of decode logic 50.

If, in contrast, the air interface standard being used is the second air interface standard AIS#2, then trigger signals 51 as output from decode logic 50 do not transition at the appropriate times. The second timer circuit 45B involving a second segmented timer 53 and a second amount of decode logic 54 is therefore provided. A second PLL 55 is provided so that the outputs of the various segments of second segmented timer 53 increment at appropriate times with respect to the frame and symbol boundaries. Decode logic 54 decodes the outputs of the second segmented timer 53 such that the trigger signals 56 for the various modem sub-circuits are asserted at the appropriate times with respect to frames of the second air interface standard.

A multiplexer 57 is provided that couples either the trigger signals 51 output by decode logic 50 or the trigger signals 56 output by decode logic 54 to corresponding various sub-circuits of the modem. The trigger signals 51 are selected if the first air interface standard is being used to communicate, whereas the trigger signals 56 are selected if the second air interface standard is being used to communicate. Another multiplexer 58 selects the clock signal output from the appropriate one of PLL 47 and PLL 55, thereby synchronizing operation of ADC 15 and DAC 16 with respect to incoming and outgoing information flow. Over time, the synchronization of the changing of the various segment outputs of a segmented timer may become offset in time with respect to the structure of the frame being processed. Lines 59 and dashed arrow 60 represent a mechanism by which processor 36 can use bus 44 to write to and set the current count value of timers 46 and 53 to adjust the incrementing of counter output values in time to phase-align the changing of counter output values with respect to frame and/or symbol boundaries. Processor 36 executes a time tracking routine to determine how to time-adjust timers 46 and 53.

In one example of FIG. 3, the structure of timer circuit 45A is of a conventional design for controlling the sub-circuits of a modem for a first air interface standard, and the structure of timer circuit 45B is of a conventional design for controlling the sub-circuits of a modem for a second air interface standard. Which one of the two conventional structures is employed at a given time to control the modem sub-circuits 31-34 and 38-42 depends on the air interface standard being used. The circuit of FIG. 3 has a limitation in that the timing of the various trigger signals cannot be easily changed to accommodate another air interface standard. Using the approach illustrated in FIG. 3, the timer circuits of the timer block 45 are hardwired to generate particular trigger signals for controlling modem sub-circuits in accordance with a particular air interface standard. Timer block 45 is therefore not a general purpose timer block. Timer block 45 cannot be used to support other or different air interface standards and/or other modem sub-circuits in new digital baseband integrated circuit designs.

Figure 4:
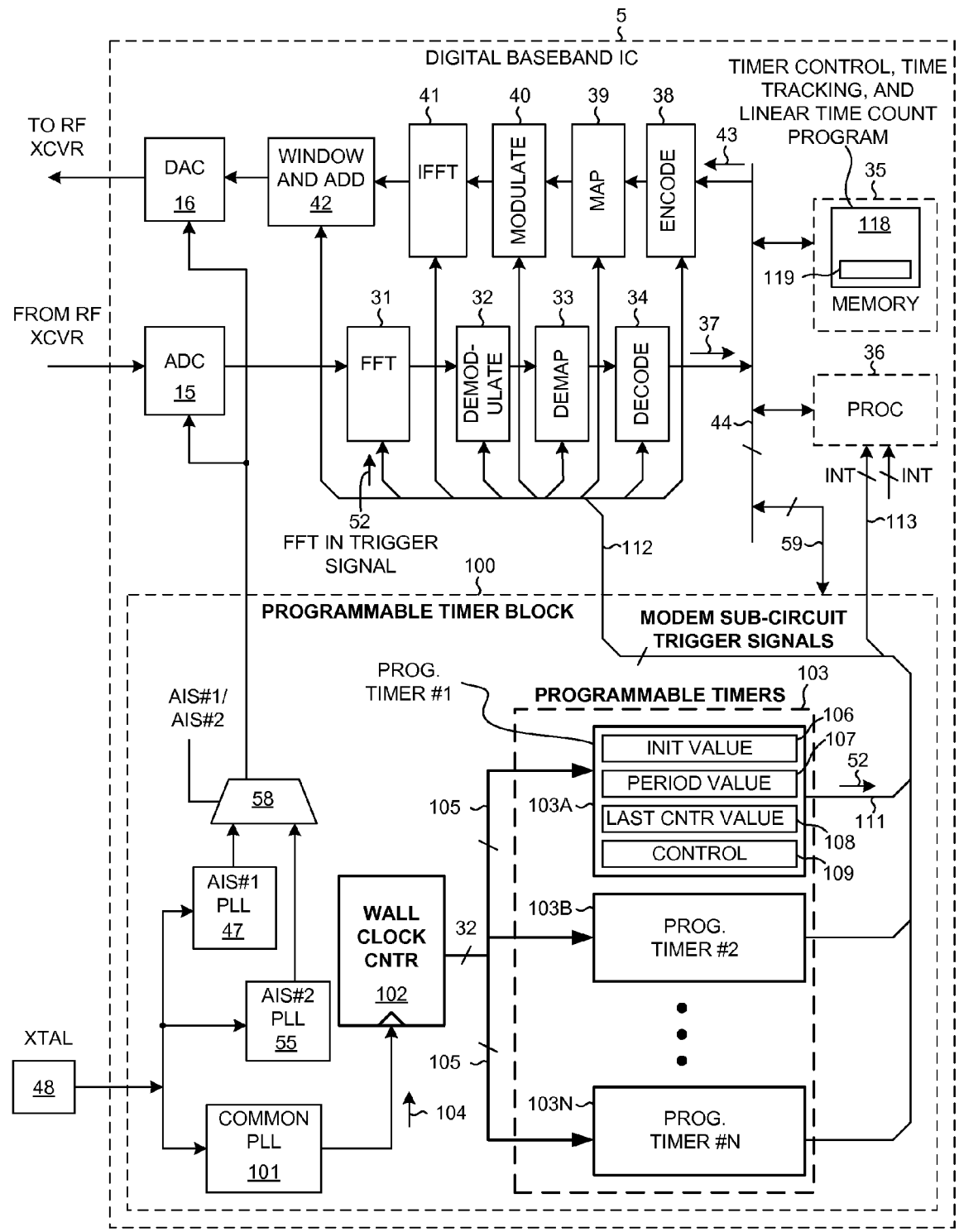
FIG. 4 is a simplified block diagram of a second embodiment of the digital baseband integrated circuit 5 of the mobile communication device 1 of FIGS. 1 and 2.

FIG. 4 illustrates a second embodiment of the digital baseband integrated circuit 5 of FIGS. 1 and 2. The modem receive path sub-circuits 15, 31, 32, 33 and 34 of FIG. 4 are identical to the modem receive path sub-circuits 15, 31, 32, 33 and 34 of FIG. 3, respectively. The modem transmit path sub-circuits 38, 39, 40, 41, 42, and 16 of FIG. 4 are identical to the modem transmit path sub-circuits 38, 39, 40, 41, 42 and 16 of FIG. 3, respectively. The crystal oscillator 48, PLL 47, PLL 55 and clock switching multiplexer 58 of FIG. 4 are identical to the crystal oscillator 48, PLL 47, PLL 55 and clock switching multiplexer 58 of FIG. 3, respectively. Timer block 100 of FIG. 4, however, includes a common PLL 101, a wall clock counter 102, and a plurality of N programmable timers 103. The programmable timers are also referred to as programmable signal generators.

In the diagram of FIG. 4, the N programmable timers are designated 103A, 103B through 103N. Common PLL 101 is configured by processor 36 via bus 44 and lines 59 so that it converts a reference clock signal of fixed frequency from crystal oscillator 48 into a clock signal 104 of a desired fixed frequency and supplies the clock signal 104 to the wall clock counter 102. Wall clock counter 102 is a 32-bit counter that supplies a sequence of incrementing multi-bit count values via signal conductors 105 to each of the plurality of programmable timers 103A-103N. Processor 36 can load an initial count value into wall clock counter 102 via bus 44 and conductors 59. In one operational example, at initialization time, processor 36 sets PLL 101 and PLL 47 such that clock signal 104 transitions synchronously with respect to values coming out of ADC 15, or with respect to values going into DAC 16. The 32-bit count values coming out of wall clock counter 102 therefore also increments synchronously with respect to the flow of data through the modem. The amount of time during which the count value output by wall clock counter 102 has a given value is referred to here as a clock "tick". Once the common PLL 101 and the wall clock counter 102 have been configured and started by processor 36, they are allowed to run without subsequent interference. Although an example is described here in which the incrementing of the wall clock counter occurs synchronously with respect to the start of frames to be processed, this need not be the case. As long as the clock "tick" time is adequately short, and as long as the ratio of the clock tick duration to the frame duration is known, and as long as the beginning time of the frame is known, and as long as the structure and format of the frame is known, then any desired particular portion of the frame being processed can be identified to correspond to a count value output from the wall clock counter 102.

Each of the programmable timers 103A, 103B through 103N receives the same sequence of count values via conductors 105. In this example, each of the programmable timers is of identical construction. Programmable timer 103A, for example, includes an INIT VALUE register 106, a PERIOD VALUE register 107, a LAST CNTR VALUE register 108, and a CONTROL register 109. Programmable timer 103A generates the signal 52 that is supplied via conductor 111 and bus 112 to FFT sub-circuit 31 as the FFT IN trigger control signal 52. Each of the other programmable timers 103B through 103N is similarly coupled to supply an output signal either to a modem sub-circuit or to an interrupt input of processor 36 or to both. Although not illustrated in FIG. 4, the block 36 labeled "processor" in FIG. 4 includes a maskable interrupt controller as well as a processor. Interrupt signals generated from various ones of the programmable timers are supplied via conductors 113 to input leads of the interrupt controller.

Figure 5:
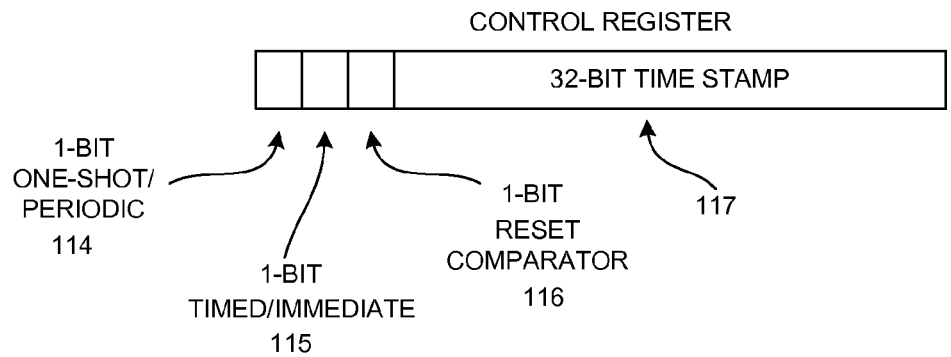
FIG. 5 is a diagram of the CONTROL register of a programmable signal generator (programmable timer) in the second embodiment of FIG. 4.

FIG. 5 is a representation of the CONTROL register 109 of programmable timer 103A. The value of the first bit 114 determines whether the programmable timer 103A operates in a one-shot mode or in a periodic mode. The value of the second bit 115 determines whether the programmable timer 103A operates in a timed mode or in an immediate mode. If the value of the third bit 116 is set, then the programmable timer 103A will deassert its output signal and reset all its register values to zero. The value of the time stamp field 117 contains a value used in the timed mode. In the timed mode, the programmable timer 103A is enabled when the count value as output from the wall clock counter 102 reaches the value in the time stamp field 117. Prior to the enabling, the programmable timer 103A does not assert its output signal.

In the one-shot mode of operation, the programmable timer 103A causes its output signal to transition high for one clock tick period starting at a time when the 32-bit count value output by the wall clock counter 102 is equal to the 32-bit value in the INIT VALUE register 106. After transitioning high for one clock tick period and then returning low, the output signal of the programmable timer 103A does not transition high again. In the periodic mode of operation, the programmable timer 103A causes its output signal to transition high for one clock tick period starting at a time when the 32-bit count value output by the wall clock counter 102 is equal to the 32-bit value in the INIT VALUE register 106. The output signal is then made to transition high for one clock tick period again starting a number of clock ticks after the first high pulse. The number of clock ticks is the value stored in the PERIOD VALUE register 107. The signal output by the programmable timer 103A continues pulsing high with a period defined by the PERIOD VALUE until the processor 36 stops the periodic pulsing operation of the programmable timer. The programmable timer 103A loads the count value at the time of the last high pulse of the signal 52 into the LAST CNTR VALUE register 108. Processor 36 can read LAST CNTR VALUE register 108 via bus 44 to determine how to control the programmable timers 103 in subsequent operation.

As explained above, the output signal 52 of the first programmable timer 103A is supplied to the FFT sub-circuit 31 as the FFT IN trigger signal. When the FFT IN trigger control signal transitions high, the FFT sub-circuit 31 is made to start performing an FFT operation. In one example, performing an FFT operation involves reading 512 values (also sometimes referred to in the art as "samples" or "sample values") from the circular FIFO output buffer of ADC 15, processing the values, and then loading a corresponding 512 processed values into the circular FIFO output buffer of FFT sub-circuit 31. Processor 36 controls when this FFT operation begins by loading appropriate values into the registers 106-109 of the first programmable timer 103A. In a similar fashion, processor 36 controls when the other modem sub-circuits begin operating by loading appropriate values into the registers of the other programmable timers that generate the trigger control signals for these other sub-circuits.

Figure 6:
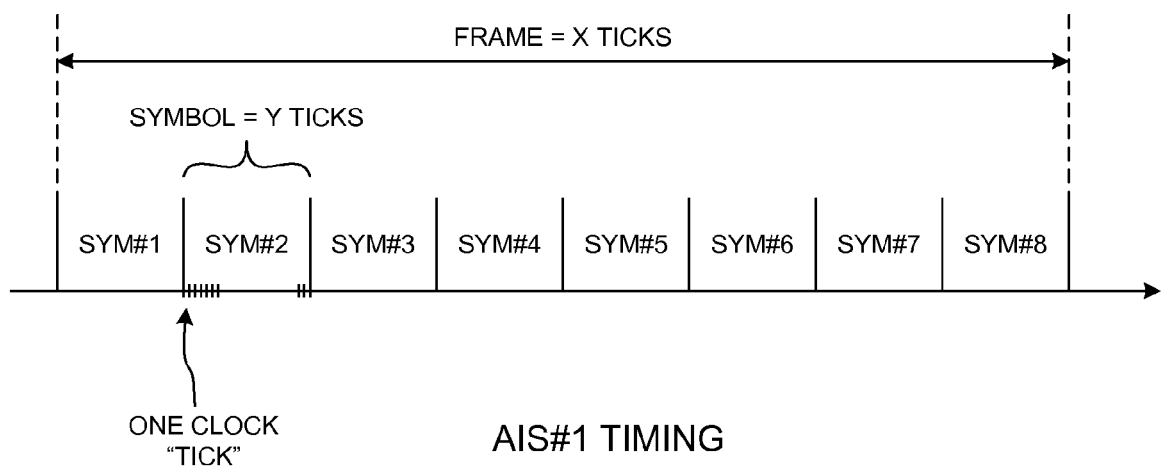
FIG. 6 is a diagram that illustrates the frame format of a first air interface standard communication.
Figure 7:
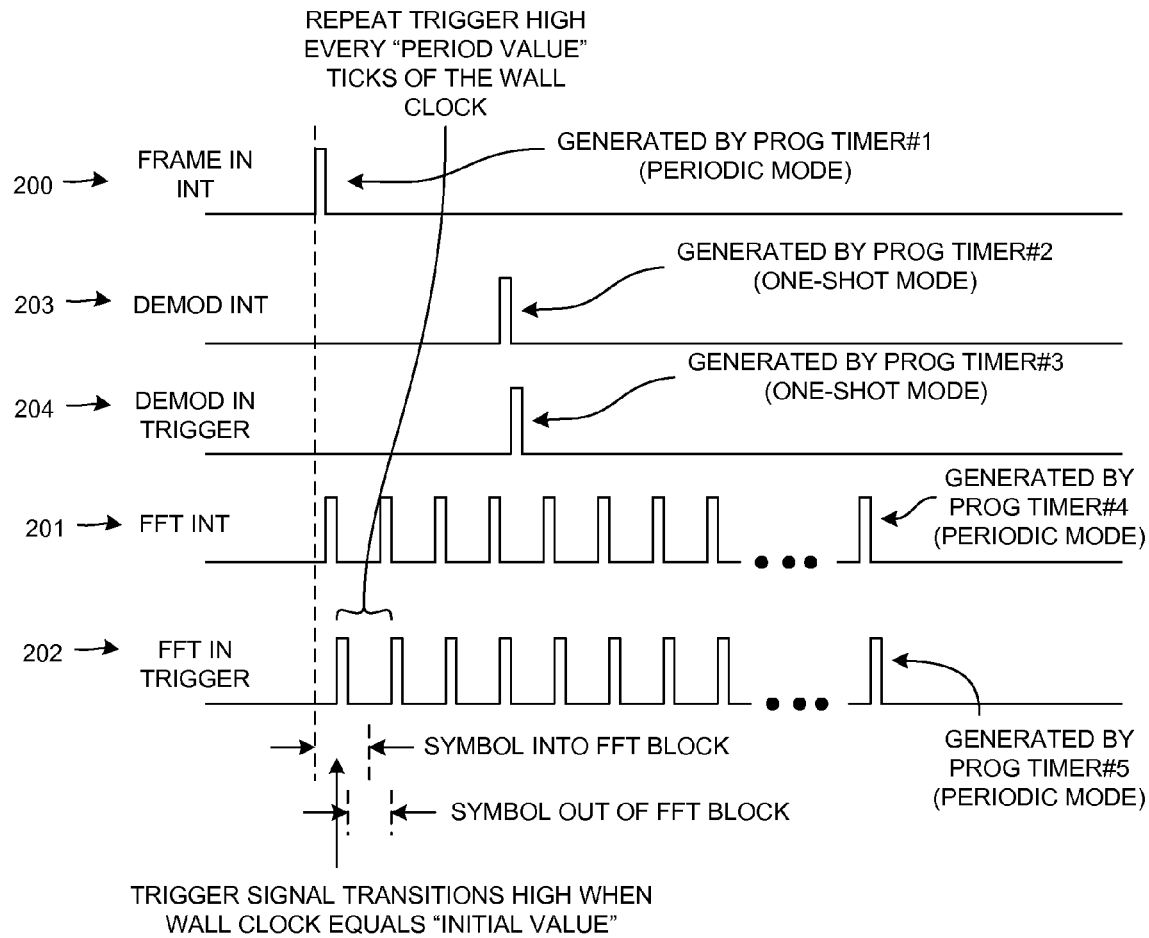
FIG. 7 is a simplified waveform diagram that illustrates various interrupt signals and trigger signals generated by the novel timer block in the second embodiment of FIG. 4.

FIGS. 6 and 7 are simplified diagrams that illustrate how processor 36 of FIG. 4 controls the programmable timers 103A-103N of FIG. 4 to generate trigger control signals at the appropriate times to control modem sub-circuits of FIG. 4 in an operational example in which a first air interface standard (AIS#1) communication is being processed. FIG. 6 illustrates the structure of an incoming frame. In this air interface standard, the frame includes eight symbol times. Each symbol time is equal to a determined number of clock "tick" times. A timer control, acquisition, time tracking, and linear time count routine 118 executing on processor 36 determines what the count value is at the beginning of a frame time for information flow going into the modem at a particular location in the modem. The initial acquisition processing step involves an additional searcher circuit of hardware in the digital baseband integrated circuit (this block is not illustrated), as well as processing performed by an amount of firmware of routine 118. The initial acquisition operation involves identifying known patterns in the incoming signal that have a known relationship with respect to the beginning of frames.

Once the count value at the beginning of a frame is determined, processor 36 loads a programmable timer to generate a high pulse with a period of the number of clock ticks that corresponds to one frame time. The programmable timer that is programmed in this way is one of the programmable timers that supplies its output signal as an interrupt signal via one of lines 113 to processor 36. The upper waveform 200 in FIG. 7 labeled "FRAME IN INT" illustrates this signal. All trigger and interrupt occurrences associated with processing the frame are timed with respect to the count value identifying the beginning of the frame. For example, an interrupt signal FFT INT is to be generated to interrupt the processor 36 shortly before the FFT sub-circuit 31 is to be started in the processing of each subsequent symbol of the frame. Accordingly, one of the programmable timers that outputs an interrupt signal to processor 36 is programmed to generate a high pulse at a count value that is offset with respect to the count value of the beginning of the frame. The count value when this time offset occurs is loaded into the INIT VALUE register of the programmable timer. The PERIOD VALUE register of the programmable timer is loaded to have the period of the duration of a symbol. The objective is to generate a periodic interrupt signal as indicated in the waveform 201. The programmable timer that is loaded in this way monitors the count values as output by the wall clock counter, and when the count value equals the value in the INIT VALUE register, then the programmable timer asserts its output signal for one clock tick period. Thereafter, the programmable timer asserts the output signal high for one clock time period at an interval equal to the PERIOD VALUE of clock ticks. In one example, each of the interrupt pulses of this signal FFT INT interrupts processor 36. In response to each interrupt, processor 36 sets up the buffer addresses of the FIFO output buffer of ADC 15 and transfers the appropriate number of values for subsequent FFT processing by FFT sub-circuit 31.

Once the values for FFT processing have been transferred, the FFT IN trigger signal 52 is made to transition high to start the FFT sub-circuit 31 processing the values. The FFT IN trigger signal 52 should appear as illustrated in waveform 202 of FIG. 7. The high pulse of the FFT IN trigger signal 52 of waveform 202 is to transition high a particular amount of time after the FFT INT high pulse for each symbol processing time. Processor 36 sets up the generation of this FFT IN trigger signal 52 by loading the registers of programmable timer 103A to generate the first high pulse at a designated count value time, and then to generate subsequent high pulses with a periodicity of a number of clock ticks such that subsequent high pulses of the FFT IN trigger are synchronized with respect to the receipt of values for symbols into FFT sub-circuit 31 as illustrated in FIG. 7. Accordingly, the times when the various high pulses of the FFT INT signal and the FFT IN trigger signal occur with respect to the beginning of the frame values are controlled by processor 36. Processor 36 controls these times by loading the appropriate programmable timers with INIT VALUE values that are offset by particular numbers of ticks with respect to the count value of the high pulse of the FRAME IN INT signal that signals the beginning of the frame.

Note that not all interrupt signals and not all trigger signals are periodic signals. FIG. 7 illustrates two signals, a DEMOD INT signal and a DEMOD IN trigger signal that are not periodic. The DEMOD INT signal of waveform 203 of FIG. 7 is needed to interrupt processor 36 at an appropriate time such that processor 36 can ready values for operation of the demodulate sub-circuit 32. In the example of FIG. 7, processor 36 initially loads the registers of a programmable timer that supplies an interrupt signal to the processor so that the programmable timer operates in the one-shot mode. The initial value in the INIT VALUE register is set by processor 36 to be a certain tick offset with respect to the tick defining the beginning of the frame. Once loaded, this programmable counter monitors the count values as output by wall clock counter 102 and when the count value equals the value stored in the INIT VALUE register, then the programmable timer asserts its output signal high for one clock tick period. Because the programmable timer is controlled to be in the one-shot mode, the programmable timer only generates this one high pulse. The high pulse is supplied to processor 36 as the interrupt signal DEMOD INT 203 of FIG. 7. The interrupt signal interrupts the processor and the processor responds by setting up the FIFO output buffer of the preceding demap sub-circuit 33 such that values necessary for the demodulate operation are provided to the demodulate sub-circuit 32.

Shortly after the high pulse of the DEMOD INT signal 203, the trigger signal DEMOD IN trigger signal 204 should transition high to start the demodulate sub-circuit 32 operating on the values for the symbol. As illustrated in FIG. 7, this DEMOD IN trigger signal 204 is also generated by loading the registers of the programmable timer that outputs the signal supplied to the demodulate sub-circuit so that the programmable timer operates in the one-shot mode and so that the high pulse occurs at a specified clock tick time.

In this way, some programmable timers are set up to interrupt processor 36 at appropriate times so that processor 36 can do housekeeping and data transfer operations in preparation for upcoming operation of a sub-circuit. Similarly, other programmable timers are set up to trigger operations of the various modem sub-circuits at specified clock tick offsets with respect to frame and/or symbol boundaries. The timing of all triggers and setup interrupt signals are made relative to the beginning of a frame.

Accordingly, processor 36 can perform time adjustment of all signals simply by shifting the timing of the pulses of the FRAME IN INT signal by programming the appropriate timer.

Figure 8:
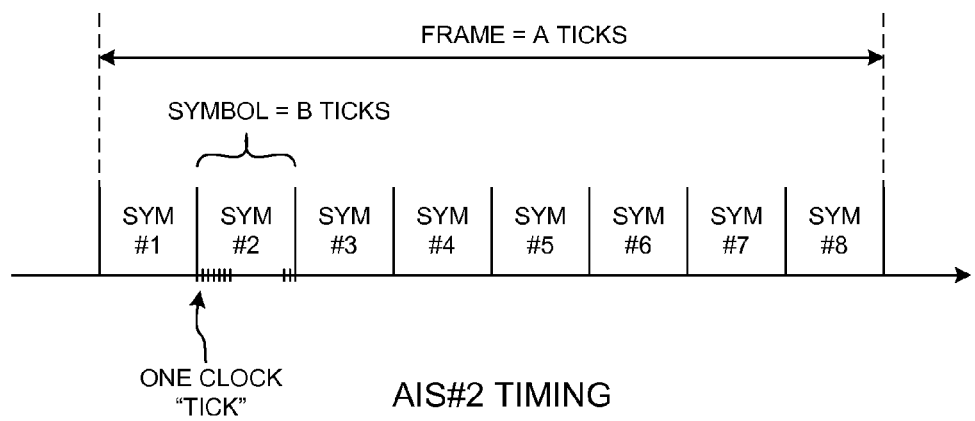
FIG. 8 is a diagram that illustrates the frame format of a second air interface standard communication.

FIG. 8 illustrates a second air interface standard frame timing. In one advantageous aspect, the same set of programmable timers 103A-103N usable to generate triggers and interrupt signals for communicating in accordance with the first air interface standard frame structure illustrated in FIG. 6 is also usable to generate triggers and interrupt signals for use in communicating in accordance with a second air interface standard of FIG. 8. In a normal operational situation, neither the clock "tick" duration nor the ordered succession of increasing multi-bit count values is changed when the air interface standard of the communication frames being processed changes from one standard to another. The clock "tick" duration is the same in the example of FIG. 8 as it was in the example of FIG. 6.

Rather than having to provide another hardwired timer circuit to generate the trigger and interrupt signals as would be required if the architecture of FIG. 3 were employed, the novel architecture of FIG. 4 allows the registers of the same set of programmable timers 103A-103N to be reloaded and used to generate the interrupt and trigger signals required to control the modem sub-circuits for a second air interface standard communication. The signals are generated by changing the PERIOD VALUE values for periodic signals. The time offsets of the pulses of the various trigger and interrupt signal are shifted in time as well, if required, by appropriate ratiometric adjustment of the INIT VALUE values.

In another advantageous aspect, in order to reduce power consumption, the modem sub-circuits and timer block of the digital baseband integrated circuit are disabled and put into a low power "sleep" state when these circuits are not needed. A separate sleep circuit, however, remains powered in the sleep state and this separate sleep circuit is clocked by a clock signal separate from the clock signals of the timer block 100. When the modem sub-circuits and the timer block are to be used again, the sub-circuits and timer block circuitry is revived and returned to the normal higher power state. Upon returning to the normal higher power state, the wall clock count value is reset by processor 36 to have the value it would have had had the timer block not been disabled during the sleep state. In one example, the wall clock counter is thirty-two bits long and the 32-bit wall clock output values eventually wrap. Processor 36, however, maintains a multi-bit count value 119 of the number of such wraps and this count is maintained in memory 35. The multi-bit count value 119 is of so many bits that the overall linear time count will not wrap throughout the entire operating life (for example, more than five years) of mobile communication device 1. This count 119 maintained by processor 36 can be considered to be the most significant bits of a "linear time count", whereas the wall clock output value can be considered to be the least significant bits of the linear time count. In recovering from a time in the sleep state, the overall linear time count value is updated to be the value it would have been had there been no sleep time. Processor 36 updates the most significant bit portion 119 that is stored in memory 35. Due to the architecture of the timer block 100, recovery from a time in the sleep state is simplified in comparison to other hardwired timer architectures because in the timers in the circuit of FIG. 4 does not store state information. Consequently, the control values of the programmable timers need not be changed from the values they had when the sleep state was entered.

Figure 9:
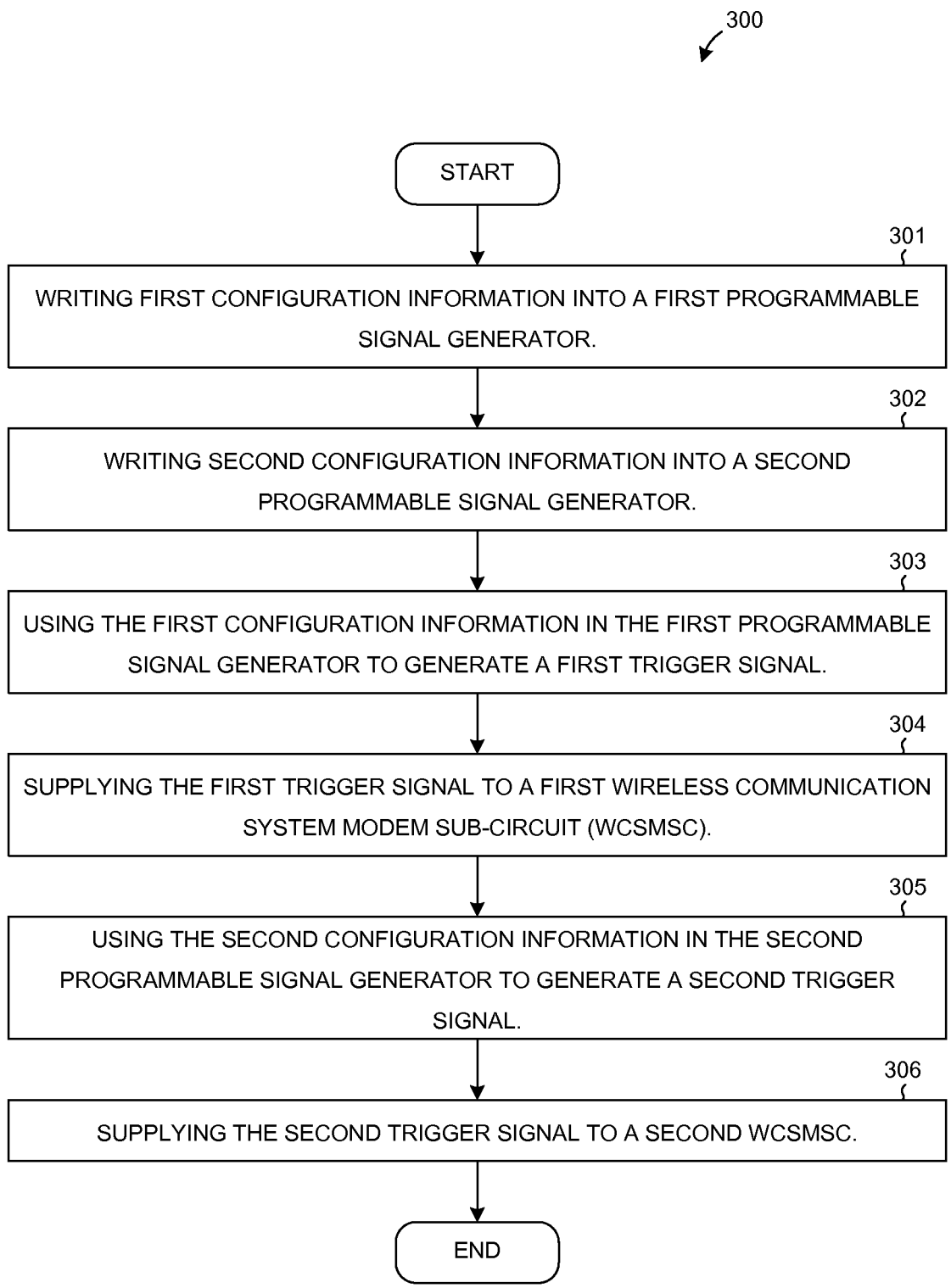
FIG. 9 is a flowchart of a method in accordance with one novel aspect.

FIG. 9 is a simplified flowchart representation of a method 300 in accordance with one novel aspect. First configuration information is written into a first programmable signal generator (step 301) and second configuration information is written into a second programmable signal generator (step 302). In one example of the method 300, it is processor 36 of FIG. 4 that writes the configuration information into the programmable timers 103A and 103B of FIG. 4. The first configuration information includes values written into the INIT VALUE register, the PERIOD VALUE register and the CONTROL register of the first programmable timer 103A. The second configuration information includes values written into the INIT VALUE register, the PERIOD VALUE register and the CONTROL register of the second programmable timer 103B. The first configuration information is then used (step 303) to generate a first trigger signal that is supplied (step 304) to a first Wireless Communication System Modem Sub-Circuit (WCSMSC). The second configuration information is used (step 305) to generate a second trigger signal that is supplied (step 306) to a second WCSMSC. In one example of the method 300, both the first and second programmable timers 103A and 103B receive the same sequence of incrementing multi-bit count values. The first programmable signal generator 103A detects when a multi-bit count value of the sequence equals the value in the INIT VALUE register of the first programmable signal generator and in response causes the first trigger signal to transition in step 303. Similarly, the second programmable signal generator 103B detects when a multi-bit count value of the sequence equals the value in the INIT VALUE register of the second programmable signal generator and in response causes the second trigger signal to transition in step 305.

Although certain specific embodiments are described above for instructional purposes, the teachings of this patent document have general applicability and are not limited to the specific embodiments described above. In one example, a WCSMSC is a CDMA rake receiver, and in another example, a WCSMSC is a GSM slot processor. The modem sub-circuits controlled are not limited to the particular sub-circuits illustrated above in FIGS. 3 and 4. The functions to be controlled can be any type of OFDM, CDMA and/or TDMA functions. Although wireless communication system modem sub-circuits are involved in the example above, the types of sub-circuits that can be controlled are not limited to wireless communication system sub-circuits, but rather include sub-circuits of other modems including wired modems including DSL modems. Although wall clock counter 102 in one example is a 32-bit hardwired counter, the wall clock counter may have another number of bits and may be made to wrap at any arbitrary count value, and the timing of this wrapping may be unrelated to system time. In one example, the various programmable timers are used to control various sub-circuits that operate concurrently. In another example, the programmable timers are used to control different sets of sub-circuits, where the sub-circuits of one set do not operate concurrently with the sub-circuits of another set. A first set of sub-circuits may be provided to perform LTE processing, whereas a second set of sub-circuits is provided to perform WiMAX processing, and only one of the two sets is operated and controlled by the programmable timers at a given time. Although a novel set of processor-readable instructions can be stored in a memory device as described above, in other novel aspects a novel set of processor-readable instructions is stored on a processor-readable medium such as a hard disk, an optical disc, a flash memory, or other suitable medium used to store software and/or to transport software. The processor-readable medium need not be a part of a communication device or part of an integrated circuit involving modem sub-circuits.

In one or more embodiments, the functions described may be implemented in hardware, software, firmware, or any combination thereof. If implemented in software, the functions may be stored on or transmitted over as one or more instructions or code on a processor-readable medium. Processor-readable media includes both computer storage media and communication media including any media that facilitates transfer of a computer program from one place to another. A storage media may be any available media that can be accessed by a computer or processor. By way of example, and not limitation, such processor-readable or computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disc and blu-ray disc where disks usually reproduce data magnetically, while discs reproduce data optically with lasers. Combinations of the above should also be included within the scope of processor-readable and computer readable media. Accordingly, various modifications, adaptations, and combinations of the various features of the described specific embodiments can be practiced without departing from the scope of the claims that are set forth below.

What is claimed is:

1. An integrated circuit comprising:
a first Wireless Communication System Modem Sub-Circuit (WCSMSC);
a second WCSMSC;
a counter that outputs a sequence of multi-bit count values;
a first programmable signal generator that receives the sequence of multi-bit count values and that supplies a first control signal to the first WCSMSC; and
a second programmable signal generator that receives the sequence of multi-bit count values and that supplies a second control signal to the second WCSMSC;
wherein the first programmable signal generator and the second programmable signal generator are configured to be programmed to supply the first control signal and the second control signal at a first time period to enable communicating according to a first one of multiple air interface standard communications by controlling respective different start and stop times of each of the first WCSMSC and the second WCSMSC in order to process a frame according to the first one of the multiple air interface standard communications by causing the first WCSMSC to perform a first set of operations required to process the frame according to the first one of the multiple air interface standard communications and causing the second WCSMSC to perform a second set of operations required to process the frame according to the first one of the multiple air interface standard communications, wherein the same first programmable signal generator and the second programmable signal generator are configured to be programmed to supply another first control signal and another second control signal at another time period to enable communicating according to a second one of the multiple air interface standard communications by controlling respective other different start and stop times of each of the first WCSMSC and the second WCSMSC in order to process another frame according to the second one of the multiple air interface standard communications by causing the first WCSMSC to perform another first set of operations required to process the other frame according to the second one of the multiple air interface standard communications and causing the second WCSMSC to perform another second set of operations required to process the other frame according to the second one of the multiple air interface standard communications.

2. The integrated circuit of claim 1, further comprising:
logic that supplies first configuration information to the first programmable signal generator, and that supplies second configuration information to the second programmable signal generator.

3. The integrated circuit of claim 1, further comprising:
a processor, wherein the processor can write first configuration information into the first programmable signal generator, and wherein the processor can write second configuration information into the second programmable signal generator.

4. The integrated circuit of claim 3, further comprising:
a third programmable signal generator that receives the sequence of multi-bit count values and that supplies an interrupt signal to the processor.

5. The integrated circuit of claim 3, wherein the first configuration information includes a first value, wherein the first programmable signal generator causes the first control signal to transition at a time when a multi-bit count value output by the counter matches the first value.

6. The integrated circuit of claim 5, wherein the first configuration information further includes a second value, wherein the second value defines a period of the first control signal.

7. The integrated circuit of claim 1, wherein the first programmable signal generator stores a first value, wherein the first programmable signal generator detects when the multi-bit count value output by the counter equals the first value and in response causes the first control signal to transition.

8. The integrated circuit of claim 1, wherein the first WCSMSC performs a Fast Fourier Transform (FFT) operation.

9. The integrated circuit of claim 1, wherein the first WCSMSC is a CDMA rake receiver.

10. The integrated circuit of claim 1, wherein the first WCSMSC is a GSM slot processor.

11. The integrated circuit of claim 3, wherein the counter receives a clock signal, and wherein the processor maintains a linear time count that is a count of clocks of the clock signal, and wherein the linear time count does not wrap for an operating time of more than five years.

12. The integrated circuit of claim 3, further comprising:
a phase-locked loop (PLL) that receives a reference clock signal and that outputs a clock signal to the counter, wherein the PLL can be configured by the processor.

13. A method comprising:
writing first configuration information into a first programmable signal generator;
writing second configuration information into a second programmable signal generator;
using the first configuration information in the first programmable signal generator to generate a first control signal;
supplying the first control signal to a first Wireless Communication System Modem Sub-Circuit (WCSMSC);
using the second configuration information in the second programmable signal generator to generate a second control signal; and
supplying the second control signal to a second WCSMSC, wherein the first programmable signal generator, the second programmable signal generator, the first WCSMSC, and the second WCSMSC are parts of an integrated circuit;
wherein the first programmable signal generator and the second programmable signal generator are configured to be programmed to supply the first control signal and the second control signal at a first time period to enable communicating according to a first one of multiple air interface standard communications by controlling respective different start and stop times of each of the first WCSMSC and the second WCSMSC in order to process a frame according to the first one of the multiple air interface standard communications by causing the first WCSMSC to perform a first set of operations required to process the frame according to the first one of the multiple air interface standard communications and causing the second WCSMSC to perform a second set of operations required to process the frame according to the first one of the multiple air interface standard communications, wherein the same first programmable signal generator and the second programmable signal generator are configured to be programmed to supply another first control signal and another second control signal at another time period to enable communicating according to a second one of the multiple air interface standard communications by controlling respective other different start and stop times of each of the first WCSMSC and the second WCSMSC in order to process another frame according to the second one of the multiple air interface standard communications by causing the first WCSMSC to perform another first set of operations required to process the other frame according to the second one of the multiple air interface standard communications and causing the second WCSMSC to perform another second set of operations required to process the other frame according to the second one of the multiple air interface standard communications.

14. The method of claim 13, further comprising:
using a counter to generate a sequence of multi-bit count values; and
supplying the sequence of multi-bit count values to the first programmable signal generator and to the second programmable signal generator.

15. The method of claim 13, further comprising:
writing third configuration information into a third programmable signal generator;
using the third configuration information in the third programmable signal generator to generate an interrupt signal; and
using the interrupt signal to interrupt a processor, wherein the third programmable signal generator and the processor are parts of the integrated circuit.

16. The method of claim 13, wherein writing the first configuration information and writing the second configuration information are performed by a processor of the integrated circuit.

17. The method of claim 14, wherein the first configuration information includes a first value, wherein the first programmable signal generator is configured to detect when the multi-bit count value output by the counter equals the first value and in response causes the first control signal to transition.

18. The method of claim 13, wherein the first configuration information includes a first value and a second value, wherein the first value determines a time when the first control signal transitions, and wherein the second value determines a period of the first control signal.

19. The method of claim 13, wherein the first WCSMSC performs a Fast Fourier Transform (FFT) operation.

20. The method of claim 13, further comprising:
putting the counter into a lower power consumption sleep state in which the sequence of multi-bit count values does not increment; and
returning the counter to a higher power consumption normal operation state in which the sequence of multi-bit count values does increment, and upon said returning loading the counter with an initial count value.

21. An integrated circuit comprising:
a circuit that outputs a sequence of multi-bit count values;
first means for determining that a first stored value corresponds to a multi-bit count value of the sequence and in response causes a first control signal to transition, and wherein the first means also includes first means for supplying the first control signal to a first Wireless Communication System Modem Sub-Circuit (WCSMSC); and
second means for determining that a second stored value corresponds to a multi-bit count value of the sequence and in response causes a second control signal to transition, and wherein the second means also includes second means for supplying the second control signal to a second WCSMSC;
wherein the first means and the second means are configured to be programmed to supply the first control signal and the second control signal at a first time period to enable communicating according to a first one of multiple air interface standard communications by controlling respective different start and stop times of each of the first WCSMSC and the second WCSMSC in order to process a frame according to the first one of the multiple air interface standard communications by causing the first WCSMSC to perform a first set of operations required to process the frame according to the first one of the multiple air interface standard communications and causing the second WCSMSC to perform a second set of operations required to process the frame according to the first one of the multiple air interface standard communications, wherein the same first means and the second means are configured to be programmed to supply another first control signal and another second control signal at at another time period to enable communicating according to a second one of the multiple air interface standard communications by controlling respective other different start and stop times of each of the first WCSMSC and the second WCSMSC in order to process another frame according to the second one of the multiple air interface standard communications by causing the first WCSMSC to perform another first set of operations required to process the other frame according to the second one of the multiple air interface standard communications and causing the second WCSMSC to perform another second set of operations required to process the other frame according to the second one of the multiple air interface standard communications.

22. The integrated circuit of claim 21, wherein the first WCSMSC performs a Fast Fourier Transform (FFT) operation, and wherein the second WCSMSC performs an Inverse Fast Fourier Transform (IFFT) operation.

23. The integrated circuit of claim 21, further comprising:
a processor that sets the first stored value and that sets the second stored value.

24. The integrated circuit of claim 21, wherein the first means is also for storing a third stored value, and wherein the first means is also for using the third stored value to set a period of the first control signal.

25. A computer program product embedded in a non-transitory computer readable medium, the computer program product being executable on one or more processors and comprising:
code for causing a computer to configure a time base generator such that the time base generator outputs a sequence of multi-bit count values;
code for causing the computer to write a first value into a first programmable timer such that the first programmable timer determines when a count value of the sequence of multi-bit count values corresponds to the first value and in response causes a first control signal to transition, wherein the first control signal is supplied to a first Wireless Communication System Modem Sub-Circuit (WCSMSC); and
code for causing the computer to write a second value into a second programmable timer such that the second programmable timer determines when a count value of the sequence of multi-bit count values corresponds to the second value and in response causes a second control signal to transition, wherein the second control signal is supplied to a second WCSMSC, wherein the time base generator, the first programmable timer, the second programmable timer, the first WCSMSC, the second WCSMSC, and the computer-readable medium are parts of an integrated circuit;

wherein the first programmable timer and the second programmable timer are configured to be programmed to supply the first control signal and the second control signal at a first time period to enable communicating according to a first one of multiple air interface standard communications by controlling respective different start and stop times of each of the first WCSMSC and the second WCSMSC in order to process a frame according to the first one of the multiple air interface standard communications by causing the first WCSMSC to perform a first set of operations required to process the frame according to the first one of the multiple air interface standard communications and causing the second WCSMSC to perform a second set of operations required to process the frame according to the first one of the multiple air interface standard communications, wherein the same first programmable timer and the second programmable timer are configured to be programmed to supply another first control signal and another second control signal at another time period to enable communicating according to a second one of the multiple air interface standard communications by controlling respective other different start and stop times of each of the first WCSMSC and the second WCSMSC in order to process another frame according to the second one of the multiple air interface standard communications by causing the first WCSMSC to perform another first set of operations required to process the other frame according to the second one of the multiple air interface standard communications and causing the second WCSMSC to perform another second set of operations required to process the other frame according to the second one of the multiple air interface standard communications.

26. The computer program product of claim 25, wherein the first WCSMSC performs a Fast Fourier Transform (FFT) operation, and wherein the second WCSMSC performs an Inverse Fast Fourier Transform (IFFT) operation.

27. A method comprising:
generating a sequence of multi-bit count values on a communication device, wherein the sequence will not repeat for time of operation of the communication device of more than five years;
supplying a first value to a programmable timer such that the programmable timer determines when a count value of the sequence of multi-bit count values corresponds to the first value and in response generates a first control signal; and
receiving a time-adjust communication from a time tracking mechanism and in response supplying a second value to the programmable timer such that the programmable timer determines when a count value of the sequence of multi-bit count values corresponds to the second value and in response generates a second control signal, wherein the programmable timer and the time tracking mechanism are parts of the communication device;
wherein the programmable timer is configured to be programmed to supply the first control signal and the second control signal at a first time period to enable communicating according to a first one of multiple air interface standard communications by controlling respective different start and stop times of each of a first Wireless Communication System Modem Sub-Circuit (WCSMSC) and a second WCSMSC in order to process frames a frame according to the first one of the multiple air interface standard communications by causing the first WCSMSC to perform a first set of operations required to process the frame according to the first one of the multiple air interface standard communications and causing the second WCSMSC to perform a second set of operations required to process the frame according to the first one of the multiple air interface standard communications, wherein the programmable timer is configured to be programmed to supply another first control signal and another second control signal at another time period to enable communicating according to a second one of the multiple air interface standard communications by controlling respective other different start and stop times of each of the first WCSMSC and the second WCSMSC in order to process another frame according to the second one of the multiple air interface standard communications by causing the first WCSMSC to perform another first set of operations required to process the other frame according to the second one of the multiple air interface standard communications and causing the second WCSMSC to perform another second set of operations required to process the frame according to the second one of the multiple air interface standard communications.

28. The method of claim 27, wherein the first and second control signals are interrupt pulses supplied to a processor, and wherein the processor is a part of the communication device.

29. The method of claim 27, wherein the first and second control signals are supplied to a sub-circuit of a modem, and wherein the modem is a part of the communication device.

30. The method of claim 27, wherein the time tracking mechanism is a first set of processor-executable instructions executed by a processor, and wherein a second set of processor-executable instruction executed by the processor receives the time-adjust communication and supplies the second value to the programmable timer.

* * * * *